United States Patent [19]

Seki

[11] 3,840,818

[45] Oct. 8, 1974

[54] FULL-WAVE RECTIFIER CIRCUIT

[75] Inventor: Kunio Seki, Tokyo, Japan

[73] Assignee: Hitachi, Ltd., Tokyo, Japan

[22] Filed: Oct. 4, 1973

[21] Appl. No.: 403,400

[30] Foreign Application Priority Data

Oct. 4, 1972 Japan .............................. 47-99031

[52] U.S. Cl................. 329/166, 329/103, 330/30 D

[51] Int. Cl. ............................................. H03d 3/06

[58] Field of Search ........... 329/101, 102, 103, 166; 330/30 D, 19

[56] References Cited

UNITED STATES PATENTS

| | | | |
|---|---|---|---|
| 3,436,684 | 4/1969 | Mack | 329/166 |
| 3,558,925 | 1/1971 | Broverman | 329/101 |

*Primary Examiner*—John Kominski
*Attorney, Agent, or Firm*—Craig & Antonelli

[57] ABSTRACT

A full-wave rectifier circuit which comprises a differential amplifier stage, and a matrix network consisting of a plurality of resistances connected in series in the shape of an octagonal loop. The resistance matrix network receives two input signals and the inverted signals thereof, and produces a sum or a difference signal therefrom and the inverted signal thereof. The resulting signals are delivered onto one side of the differential amplifier stage, and are compared with a reference voltage signal impressed onto the other side of the differential amplifier stage. Thus, the sum or difference signal derived from the two input signals is finally full wave rectified.

11 Claims, 8 Drawing Figures

FULL-WAVE RECTIFIER CIRCUIT

BACKGROUND OF THE INVENTION

1. Field of the Invention

The present invention relates to full-wave rectifier circuits. More particularly, it relates to a full-wave rectifier circuit which detects and rectifies composite signals with the central value at a prescribed voltage.

2. Description of the Prior Art

In order to demodulate and reproduce multiplex transmission signals in a color TV receiver, an FM multiplex receiver etc., it has been proposed that a composite signal of the sum or difference between received signals or a composite signal of the sum or difference between a received signal and an internal local oscillation signal at the receiving end is subjected to full-wave rectification to thus produce a control voltage.

In such equipment, the integrated semiconductor circuit device constructed in the surface of a single semiconductor substrate normally will be employed. In this case, use of direct-coupled circuits in the interior of the integrated circuit device is advantageous from the viewpoint of reducing the number of external terminals. In the direct coupling, however, the potential of a signal deviates onto either the positive voltage side or the negative voltage side with respect to ground potential. It has therefore been impossible to attain the expected operation with the prior-art full-wave rectifier circuit.

SUMMARY OF THE INVENTION

The present invention intends to make improvements in the foregoing point.

An object of the present invention is to provide a full-wave rectifier circuit which is suitable for the form of an integrated semiconductor circuit.

Another object of the present invention is to provide a full-wave rectifier circuit which conducts detecting rectification with the central value at a predetermined reference voltage.

In order to accomplish the objects, the present invention is constructed of a matrix network and a differential amplifier stage, the matrix network consisting of resistances connected in series in the shape of a loop. The matrix network receives two signals and the respective inverted signals as it inputs, and delivers a sum or difference signal and either of the respective inverted signals as its outputs. The differential amplifier stage compares the sum or difference signal and the corresponding inverted signal with a reference voltage, and effects a switching operation for the full-wave rectification.

PREFERRED EMBODIMENTS OF THE INVENTION

The present invention will be described hereunder in conjunction with the preferred embodiments.

Figure 1:
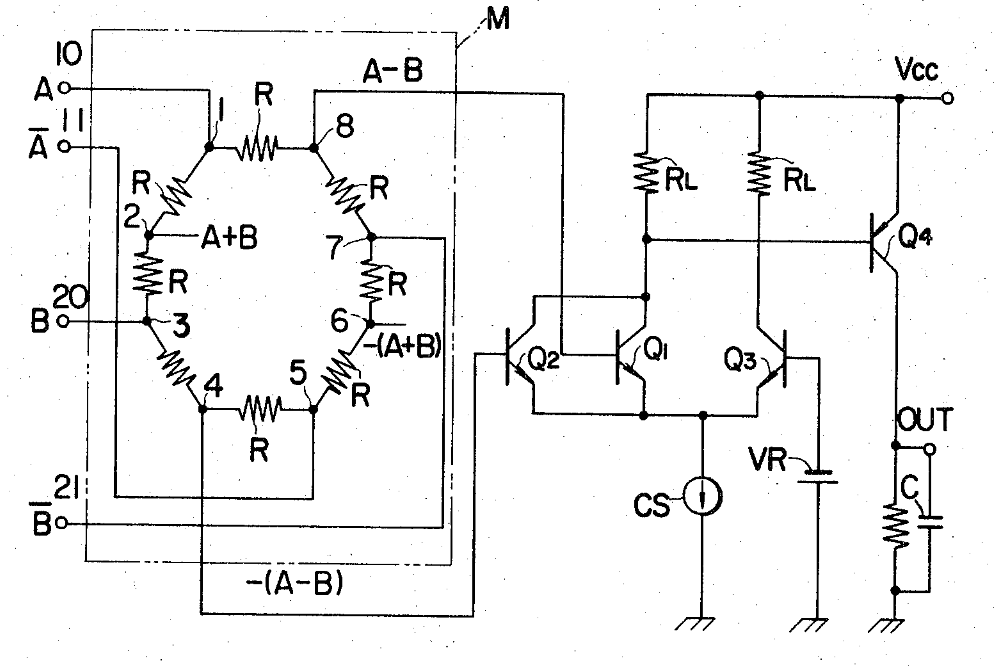
FIG. 1 is a schematic circuit diagram of an embodiment of the full-wave rectifier circuit according to the present invention.

FIG. 1 shows an embodiment according to the present invention. Reference character M designates a matrix network in which eight resistances R are connected in series in an octagonal array. Numerals 1 to 8 indicate the junctures of the resistances R. The odd junctures 1, 3, 5 and 7 are input terminals of a signal A, a signal B, the inverted signal $\bar{A}$ and the inverted signal $\bar{B}$, respectively. On the other hand, the even junctures 2, 4, 6 and 8 are output terminals of the sum signal (A + B), the inverted difference signal −(A − B), the inverted sum signal −(A + B) and the difference signal (A − B), respectively. Transistors $Q_1$ to $Q_3$ and a constant-current source CS constitute a differential amplifier stage. A transistor $Q_4$ constitutes an output buffer stage. The transistors $Q_1$ and $Q_2$ form one of the current paths of the differential amplifier stage, while the transistor $Q_3$ forms the other current path. The transistor $Q_1$ is connected to receive the difference signal (A − B) at its base, the transistor $Q_2$ has the inverted difference signal −(A − B) applied to its base, and the transistor $Q_3$ has a reference voltage $V_R$ applied to its base. The base of the transistor $Q_4$ is connected to the collectors of the transistors $Q_1$ and $Q_2$, while the collector of transistor $Q_4$ is connected to an output terminal OUT. A smoothing capacitor C is connected between the output terminal OUT and ground. The transistor $Q_4$ is herein as a P–N–P transistor, but this is not essential to the present invention. The transistors $Q_1$ and $Q_2$ and the transistor $Q_3$ are connected through respective load resistances $R_L$ to an operating power source $V_{cc}$.

Referring now to FIGS. 2(*a*) to 2(*f*), the operation of the present invention will be described. The figures illustrate the wave forms of voltages at various parts of the full-wave rectifier circuit shown in FIG. 1. Among the figures, FIGS. 2(*a*) and 2(*b*) depict the voltage wave forms of the input signals A and B; FIGS. 2(*c*) and 2(*d*) depict the difference signal (A − B) and the inverted difference signal −(A − B); FIG. 2(*e*) depicts an output signal $V_{out}$ at the output end OUT in the case where the smoothing capacitor C is not connected; and, FIG. 2(*f*) depicts the output signal $V_{out}$ in the case where the smoothing capacitor C is connected.

When the input signals A and B as shown in FIGS. 2(*a*) and 2(*b*) and their inverted signals $\bar{A}$ and $\bar{B}$ are respectively applied to the input ends 1, 3, 5 and 7 of the matrix network M, the difference signal (A − B) and the inverted difference signal −(A − B) as shown in FIGS. 2(*c*) and 2(*d*) are respectively provided at the output ends 8 and 4. The difference signal (A − B) is applied to the base of the transistor $Q_1$. When the difference signal (A − B) is higher in level than the reference potential $V_R$, that is to say, during periods $T_1$, $T_3$ and $T_5$ as shown in FIG. 2(*c*), the transistor $Q_1$ is switched to the "on" state and thus turns the transistor $Q_4$ "on." The voltage of the output OUT is therefore raised. On the other hand, the inverted difference signal −(A − B) is applied to the base of the transistor $Q_2$. When the inverted difference signal −(A − B) is higher in level than the reference potential $V_R$, that is to say, during periods $T_2$ and $T_4$, as seen in FIG. 2(*d*), the transistor $Q_2$ turns "on" to bring the transistor $Q_4$ into the conductive state. The voltage of the output OUT is therefore raised. Accordingly, pulses appear at the output OUT during the periods $T_1 - T_5$. This is nothing more than a full-wave rectification of the difference signal (A − B) with the center at the reference value $V_R$. Owing to the smoothing capacitor C connected to the output terminal OUT, a mean DC potential as shown in FIG. 2(*f*) is obtainable. Without the smoothing capacitor C, the full-wave rectification is as illustrated in FIG. 2(*e*).

Figure 3:
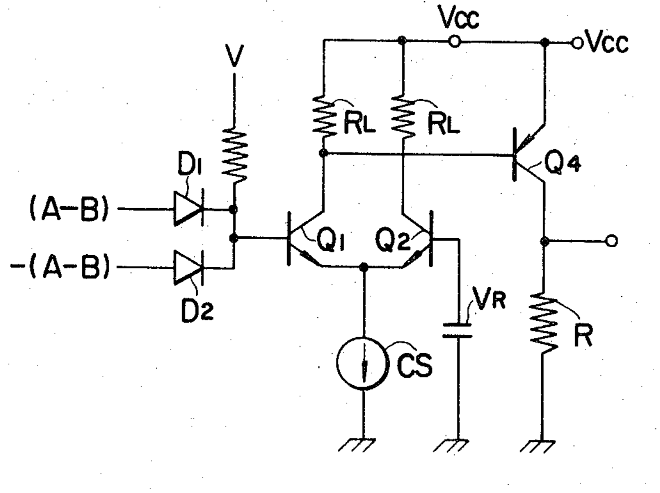
FIG. 3 is a schematic circuit diagram of another embodiment of the present invention.
Figure 2A:
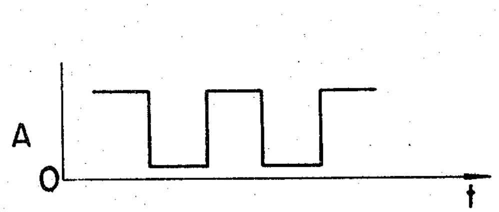
FIGS. 2(*a*) to 2(*f*) show voltage wave forms at various parts of the embodiment in FIG. 1.
Figure 2B:
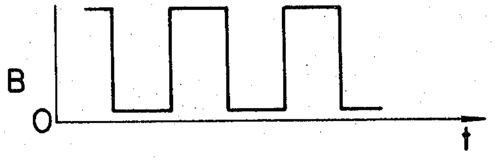
Figure 2C:
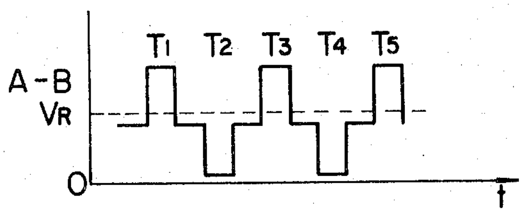
Figure 2D:
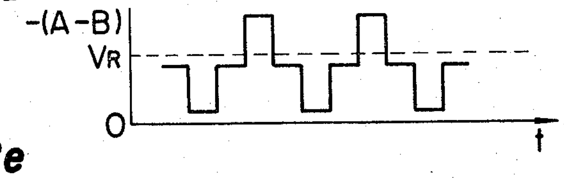
Figure 2E:
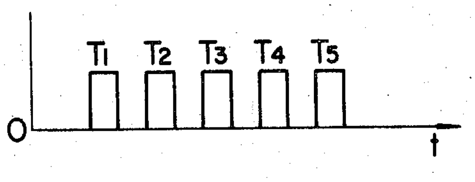
Figure 2F:
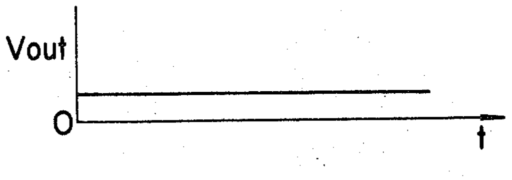

FIG. 3 shows another embodiment of a full-wave rectifier circuit according to the present invention. It discloses a modification of means receiving the difference signal and the inverted difference signal, which means serves to turn the transistor $Q_1$ "on" when the difference signal or the inverted difference signal is of level exceeding the reference value $V_R$. In the embodiment in FIG. 3, the difference signal (A − B) and the inverted difference signal −(A − B) are respectively applied through diodes $D_1$ and $D_2$ to the base of the transistor $Q_1$. Such a construction makes it possible that, at the times at which either the difference signal or the inverted difference signal becomes higher in level than the reference voltage $V_R$, the transistor $Q_1$ is turned "on" without the mutual influence of the difference signal and the inverted difference signal. The difference signals can accordingly be rectified in the full wave with the central value at the reference voltage $V_R$.

Although the present invention has been explained above on the basis of the use of difference signals, quite the same effect is produced in the case of use of the sum signals derived from junctures 2 and 6 of the resistor matrix *m*.

As stated above, in accordance with the present invention, it is possible to synthesize the sum signals or difference signals of two input signals, to directly couple the synthesized output signals to the full-wave rectifier stage, where they are full wave rectified with respect to the predetermined reference voltage. The invention is therefore most suitable for manufacture in the form of an integrated semiconductor circuit. Moreover, the reference voltage can be set at any desired value. The invention therefore increases the degree of freedom in the case of producing a control voltage.

While I have shown and described several embodiments in accordance with the present invention it is understood that the same is not limited to the details shown and described above but is susceptible of numerous changes and modifications as known to persons skilled in the art, and I therefore do not wish to be limited to the details shown and described herein but intend to cover all such changes and modifications as are obvious to one of ordinary skill in the art.

What I claim is:

1. A full-wave rectifier circuit comprising a matrix network consisting of a plurality of resistance elements connected in series in the form of a loop for providing at selected output signals representing the sum and the difference and their inverted signals in response to application of two input signals and their inverted signals to selected inputs thereof, a reference voltage source, and a differential amplifier circuit connected to said matrix network to receive a selected one of said sum and difference signals and its inverted signal and connected to said reference voltage source to receive a reference voltage.

2. A full-wave rectifier circuit as defined in claim 1, wherein said resistance elements are connected in series in the form of an octagonal array.

3. A full-wave rectifier circuit as defined in claim 2, wherein said selected inputs and outputs of said matrix network are respectively provided at alternate junctures between resistance elements of said array.

4. A full-wave rectifier circuit as defined in claim 1, wherein said differential amplifier circuit includes three transistors connected in parallel and each receiving a respective one of said reference voltage, said selected one of said sum and difference signals and its inverted signal.

5. A full-wave rectifier circuit as defined in claim 4, further including a buffer amplifier circuit connected to the output of said differential amplifier and a smoothing capacitor connected to the output of said buffer amplifier.

6. A full-wave rectifier circuit as defined in claim 5, wherein said resistance elements are connected in series in the form of an octagonal array.

7. A full-wave rectifier circuit as defined in claim 6, wherein said selected inputs and outputs of said matrix network are respectively provided at alternate junctures between resistance elements of said array.

8. A full-wave rectifier circuit as defined in claim 1, wherein said differential amplifier circuit includes first and second transistors connected in parallel, first and second diodes connected to said first transistor and said matrix network to respectively apply the selected outputs of said matrix network to said differential amplifier, said reference voltage source being connected to said second transistor.

9. A full-wave rectifier circuit as defined in claim 8, further including a buffer amplifier circuit connected to the output of said differential amplifier.

10. A full-wave rectifier circuit as defined in claim 9, wherein said resistance elements are connected in series in the form of an octagonal array.

11. A full-wave rectifier circuit as defined in claim 10, wherein said selected inputs and outputs of said matrix network are respectively provided at alternate junctures between resistance elements of said array.

* * * * *